United States Patent
Merry et al.

(10) Patent No.: US 9,938,898 B2
(45) Date of Patent: Apr. 10, 2018

(54) GEARED TURBOFAN BEARING ARRANGEMENT

(75) Inventors: Brian D. Merry, Andover, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 2019 days.

(21) Appl. No.: 13/193,790

(22) Filed: Jul. 29, 2011

(65) Prior Publication Data

US 2013/0025258 A1    Jan. 31, 2013

(51) Int. Cl.
*F02C 1/00* (2006.01)
*F02C 7/06* (2006.01)
*F01D 25/16* (2006.01)

(52) U.S. Cl.
CPC .............. *F02C 7/06* (2013.01); *F01D 25/16* (2013.01); *F05D 2240/50* (2013.01)

(58) Field of Classification Search
CPC ........ F01D 25/18; F01D 25/16; F01D 25/162; F02K 3/06; F02K 3/00
USPC .......................... 60/226.1, 39.163; 184/6.11
See application file for complete search history.

(56) References Cited

U.S. PATENT DOCUMENTS

| | | | |
|---|---|---|---|
| 2,528,635 A * | 11/1950 | Bell et al. ................ | 417/247 |
| 3,287,906 A | 11/1966 | McCormick | |
| 3,524,318 A | 8/1970 | Bauger et al. | |
| 3,861,139 A | 1/1975 | Jones | |
| 5,915,917 A | 6/1999 | Eveker et al. | |
| 5,971,706 A | 10/1999 | Glista et al. | |
| 7,552,591 B2 | 6/2009 | Bart et al. | |
| 7,574,854 B2 | 8/2009 | Moniz | |
| 7,752,836 B2 * | 7/2010 | Orlando et al. ................ | 60/268 |
| 7,815,417 B2 * | 10/2010 | Somanath et al. ............ | 415/191 |
| 7,921,634 B2 * | 4/2011 | Orlando et al. ................ | 60/204 |
| 2007/0087892 A1 * | 4/2007 | Orlando et al. ............ | 475/348 |
| 2008/0056888 A1 * | 3/2008 | Somanath et al. ............ | 415/142 |
| 2008/0098717 A1 * | 5/2008 | Orlando et al. ............. | 60/226.1 |
| 2009/0151317 A1 | 6/2009 | Norris et al. | |
| 2009/0252600 A1 | 10/2009 | Winter et al. | |
| 2010/0148396 A1 | 6/2010 | Xie et al. | |

(Continued)

FOREIGN PATENT DOCUMENTS

| EP | 1887199 A2 | 2/2008 |
|---|---|---|
| EP | 1921253 A2 | 5/2008 |

(Continued)

OTHER PUBLICATIONS

European Search Report for EP Application No. 12178499.5 dated Oct. 20, 2016.

(Continued)

*Primary Examiner* — Gerald L Sung
(74) *Attorney, Agent, or Firm* — Carlson, Gaskey & Olds, P.C.

(57) ABSTRACT

A geared turbofan gas turbine engine includes a fan section and a core section. The core section includes a compressor section, a combustor section and a turbine section. The fan section includes a gearbox and a fan. A low spool includes a low turbine within the turbine section and a forward connection to a gearbox for driving the fan. The low spool is supported for rotation about the axis at a forward most position by a forward roller bearing and at an aft position by a thrust bearing.

15 Claims, 4 Drawing Sheets

(56) References Cited

U.S. PATENT DOCUMENTS

2010/0205934 A1    8/2010    Gallet
2010/0331139 A1    12/2010    McCune

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, the Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

\* cited by examiner

GEARED TURBOFAN BEARING ARRANGEMENT

BACKGROUND

This disclosure generally relates to geared turbofan gas turbine engine. More particularly, this disclosure relates to a bearing arrangement supporting rotation of a low spool shaft for a geared turbofan gas turbine engine.

A turbofan gas turbine engine includes a core section and a turbofan section. The core section includes compressor within which air is compressed and forwarded to a combustor where fuel is mixed with air and ignited to generate a stream of high-speed exhaust gases. The exhaust gases flow through a turbine section that extracts power to drive the compressor. The gas turbine engine core can include a low spool and a high spool that can either co-rotate or counter-rotate at different speeds about an axis of the engine. The low spool typically rotates at a lower speed than the high spool and drives the fan. A gearbox can be utilized to provide for the relative rotation of the fan at a different speed than the low spool.

Rotation of the low spool and the high spool is supported by bearing arrangements. Each shaft includes at least one roller bearing and one thrust bearing. The thrust bearing provides both radial and axial support for a rotating shaft. The thrust bearing is typically utilized to maintain a desired axial alignment between relative rotating and stationary elements. However, a thrust bearing requires greater space both radially and axially.

Further, in some engine architectures such as for example a geared turbofan gas turbine engine, the low spool is split into two parts. The low spool that drives a gearbox within the axial space of the compressor section and a second intermediate spool that drives an intermediate compressor. In configurations where the low spool is not split, forward thrust produced by the fan is mostly countered by rearward blow off in the turbine. However, a split low spool configuration cannot take advantage of this balance and a larger thrust bearing is required. Therefore, space within the compressor area is limited. Accordingly, the addition of the gearbox at a forward end of the low spool and/or the use of an intermediate spool reduces the available space within which a bearing arrangement can be supported.

SUMMARY

A disclosed example geared turbofan gas turbine engine includes a fan section and a core section. The core section includes a compressor section, a combustor section and a turbine section. The fan section includes a gearbox and a fan. A low spool includes a low turbine within the turbine section and a forward connection to a gearbox for driving the fan. A high spool supports compressor blades within a high compressor section and turbine blades within a high turbine portion of the turbine. The low spool is supported for rotation about the axis at a forward most position by a forward roller bearing and at an aft position by a thrust bearing.

These and other features disclosed herein can be best understood from the following specification and drawings, the following of which is a brief description.

DETAILED DESCRIPTION

Figure 1:
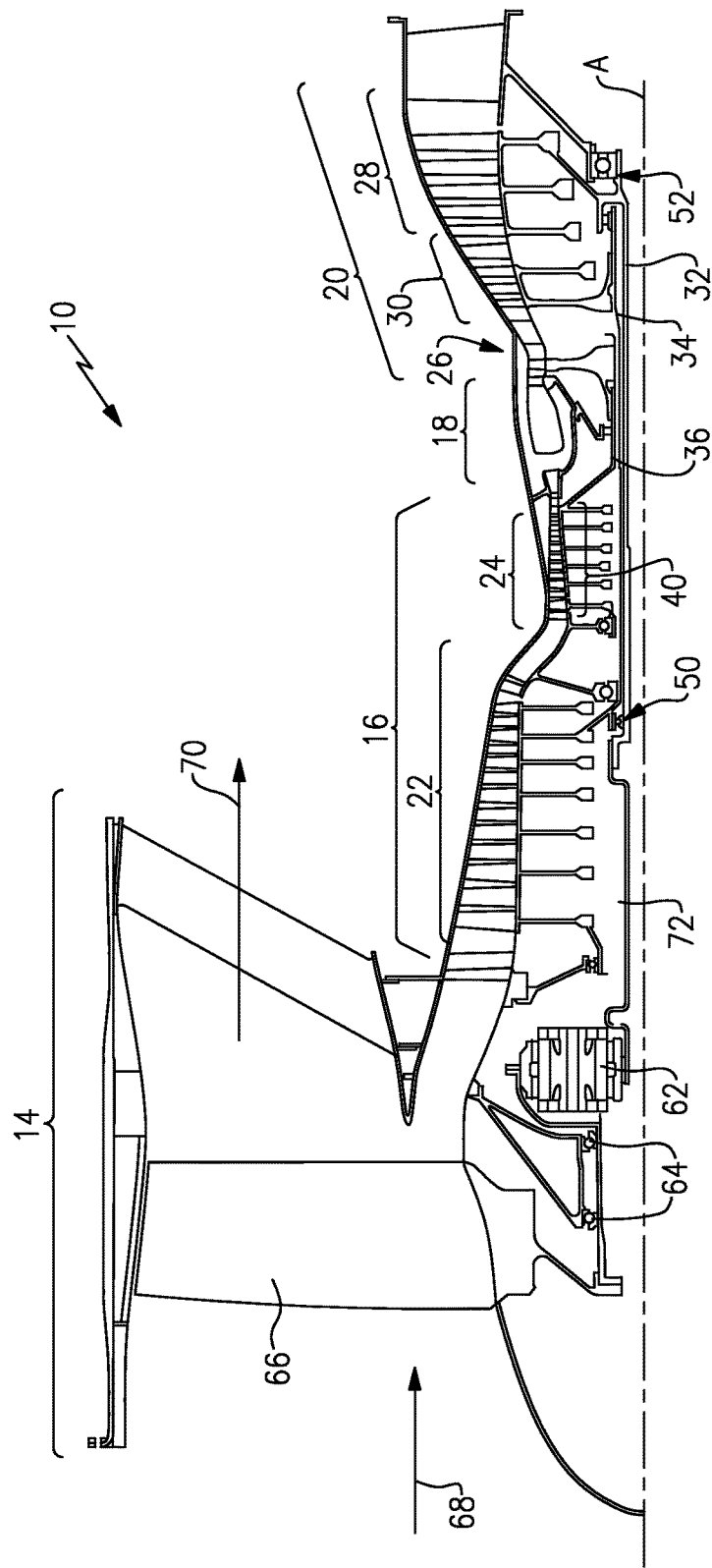
FIG. 1 is a schematic cross section of an example geared turbofan gas turbine engine.

Referring to FIG. 1, a geared turbofan gas turbine engine 10 includes a turbofan section 14 and a core section 12. Airflow 68 enters the core section 12 and is compressed in a compressor 16 with an intermediate compressor portion 22 and a high compressor portion 24. A portion of the airflow 70 bypasses the core section 12. A combustor 18 receives compressed air from the compressor 16, mixes the air with fuel and ignites the mixture to generate a high velocity gas flow stream. The high velocity gas flow stream drives a turbine 20. The example turbine 20 includes blades that drive a high spool 36, an intermediate spool 34 and a low spool 32. The example low spool 32 drives a gearbox 62 that in turn drives a fan 66 at a desired speed different than the speed of the low spool 32.

The low spool 32, intermediate spool 34 and high spool 36 are all supported for rotation about a common axis A. Rotation of the low spool 32, intermediate spool 34 and high spool 36 is supported by bearing assemblies that maintain relative radial and axial position of each spool. The low spool 32 includes a forward roller bearing 50 that maintains a desired radial position and an aft thrust bearing 52 that maintains both radial and axial position.

Axial position of the low spool 32 is provided by the aft thrust bearing 52 instead of the conventional arrangement of placing a thrust bearing at a forward position on the spool to control axial position within the compressor 16. In this example the low spool 32 does not support a low-pressure compressor portion. Instead intermediate compressor blades are supported on the intermediate spool 34. The forward portion of the low spool 32 is utilized to drive the gearbox 62 that in turn drives the fan 66. The intermediate spool 34 includes intermediate-pressure compressor blades 38 and intermediate-pressure turbine blades 30. The low spool includes at least one turbine blade 28. The high spool 34 supports turbine blades within a high turbine section 26.

The low spool 32 drives the gearbox 62 through a drive shaft 72 that provides for rotation of the fan 66 supported by fan thrust bearings 64. The roller bearing 50 requires a reduced radial and axial distance as compared to a comparable thrust bearing.

Figure 2:
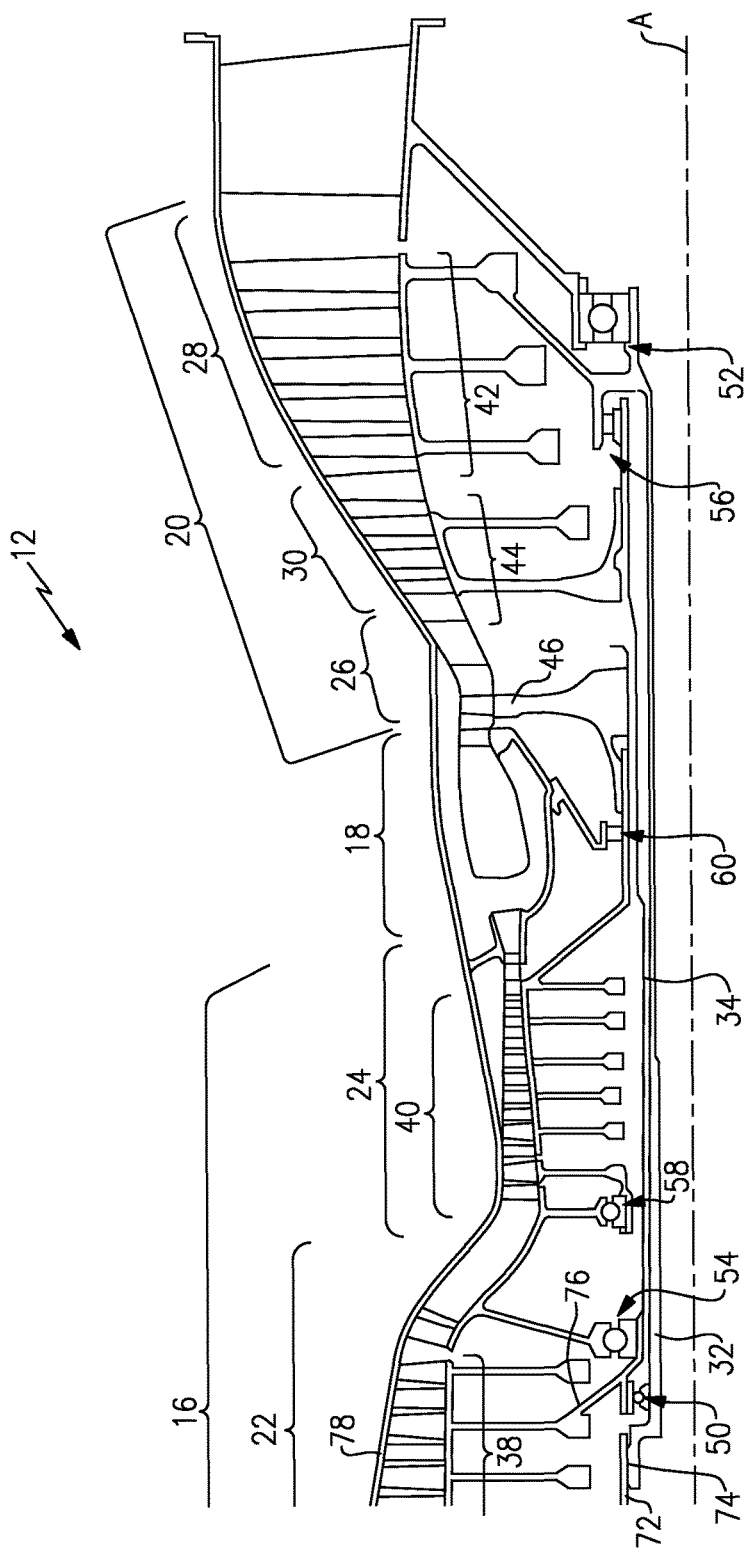
FIG. 2 is a schematic cross-section of an aft portion of the geared turbofan gas engine.

Referring to FIG. 2, the engine core 12 is shown in an enlarged cross-section with the low spool 32 supported at a forward most position by the roller bearing 50 and at an aft most position by the thrust bearing 52. The roller bearing 50 is disposed along the axis forward of a thrust bearing 54 for the intermediate spool 34 and a thrust bearing 58 for the high spool 36. The high spool 36 supports compressor blades 40 and turbine blades 46. The intermediate spool 34 supports compressor blades 38 within an intermediate pressure section 22 of the compressor. The intermediate spool 34 further supports turbine blades 44 within the turbine 20. The forward thrust bearing 54 that supports the intermediate spool 34 is supported on a support 76 that comprises a portion of the compressor case 78. The forward roller bearing 54 is also supported by the support 76 as is the forward thrust bearing 58 supporting rotation of the high spool 36. The thrust bearing 58 is supported by a support 80 of the case 78.

Figure 3:
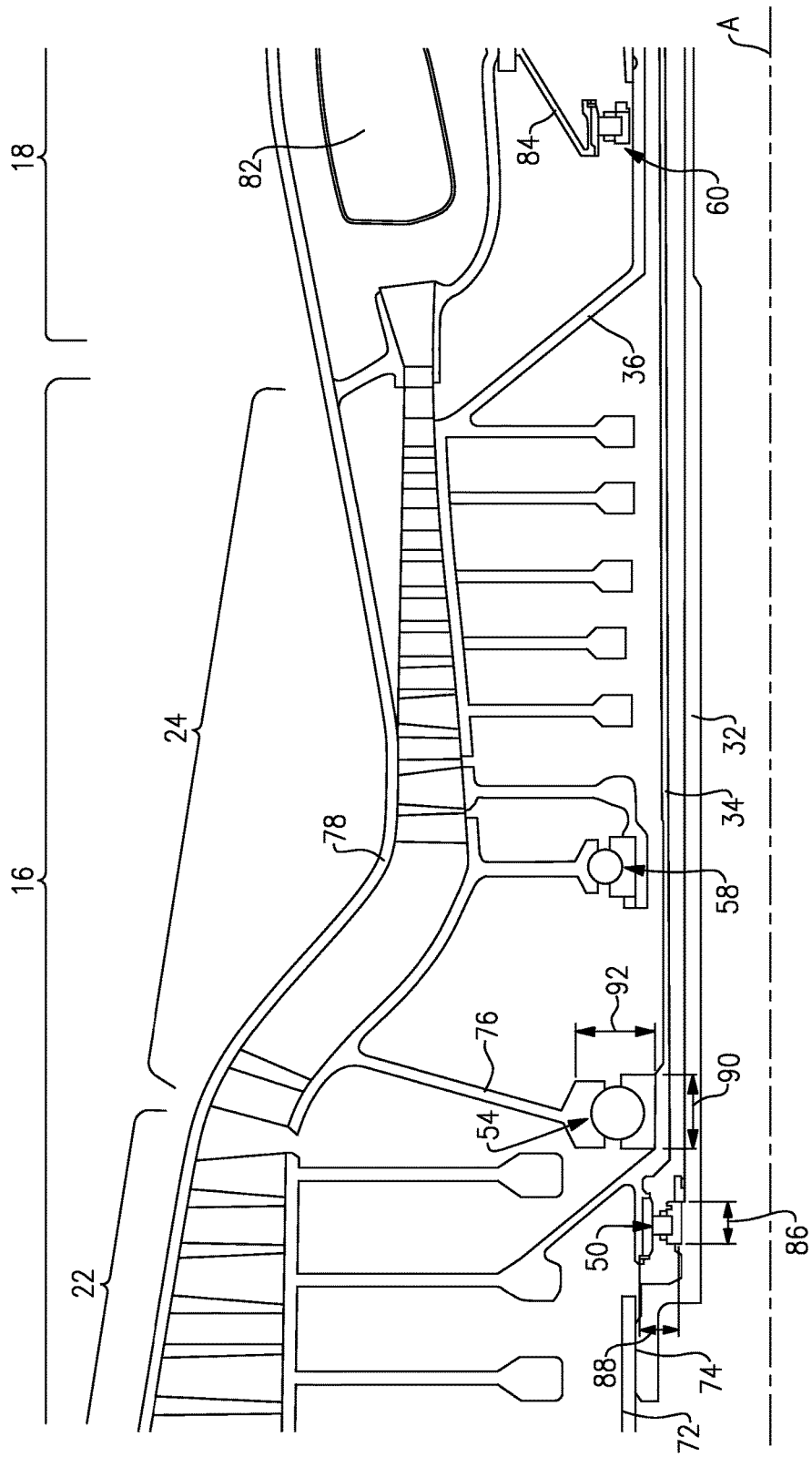
FIG. 3 is a schematic cross-section of a mid portion of the geared turbofan gas engine.

Referring to FIG. 3, the high spool 36 is supported by the forward thrust bearing 58 and by an aft roller bearing 60. The aft roller bearing 60 is disposed within the axial space of the combustor section 18. In this example, the aft roller bearing 60 is disposed within a radial distance between the combustor 82 and the axis A. A support 84 that is part of the compressor case 78 supports the roller bearing 60.

The forward roller bearing 54 that supports rotation of the low spool 32 is supported on the support 76 that also supports the forward thrust bearing 54 that supports the intermediate spool 34.

The low spool 32 includes a splined connection 74 with the drive shaft 72. The drive shaft 72 extends forward to drive the gearbox 62 (FIG. 1). The example fan 66 is supported by bearings 64. The example roller bearing 50 requires an axial space 86 and radial space 88 that is less than would be required for a comparable thrust bearing. For example, the thrust bearing 54 requires a greater axial space 90 and greater radial space 92.

Figure 4:
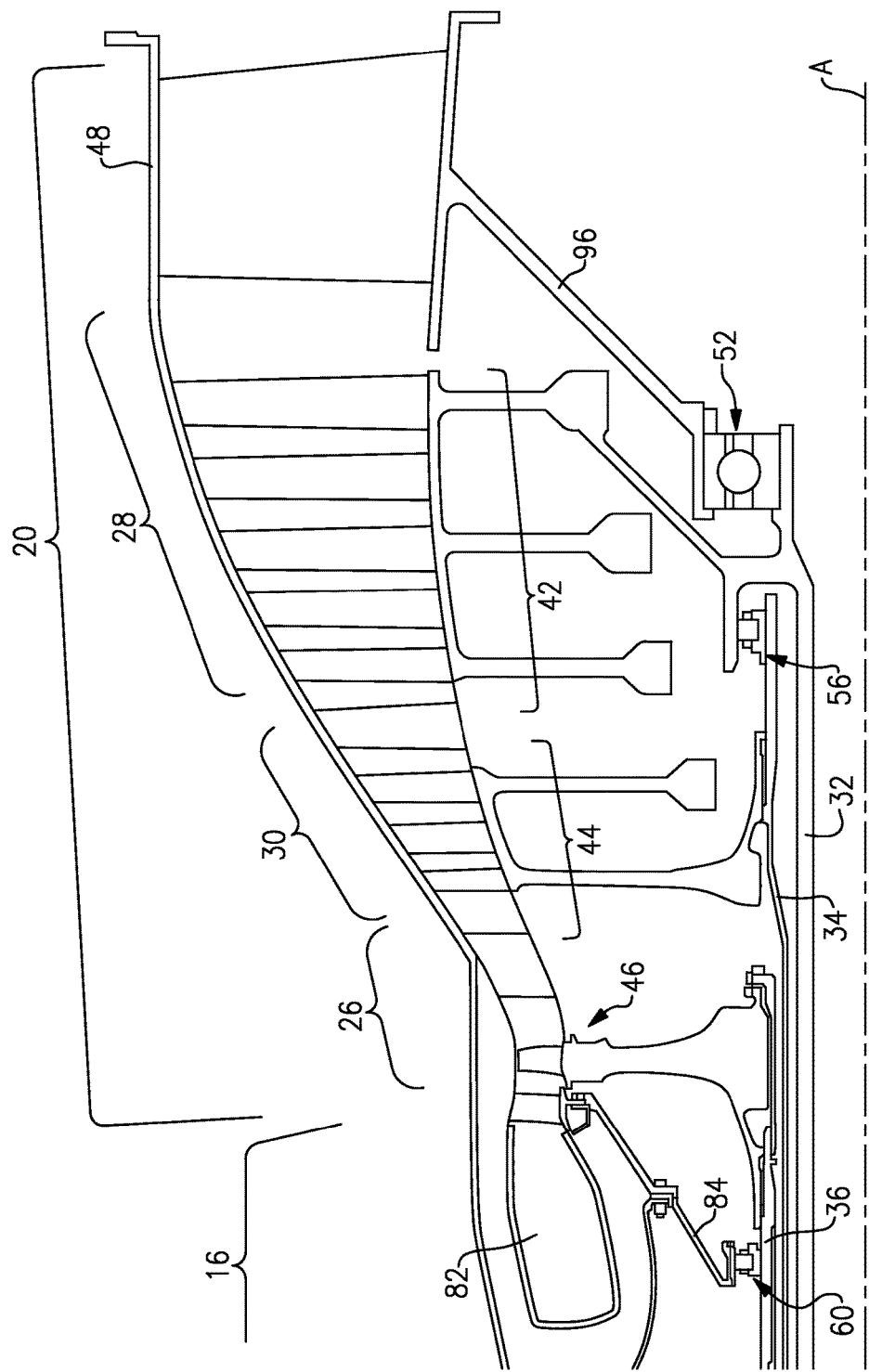
FIG. 4 is an enlarged schematic cross-section of an aft portion of the geared turbofan gas engine.

Referring to FIG. 4, the aft thrust bearing 52 for the low spool 32 is supported by a support 94 of the exhaust turbine housing 48. The low spool 32 includes turbine blades 42. The intermediate spool 34 is supported for rotation by the roller bearing 56 that is supported on the low spool 34. The aft thrust bearing 52 maintains an axial position of the turbine blades 42 within desired limits. Moreover, placement of the thrust bearing 52 on the turbine exhaust case 48 instead at the forward position provides additional spacing required for the thrust bearing 52 and gearbox 62 and the forward geared fan section 14.

As appreciated, the disclosed example includes the intermediate spool 34, however, other engine architectures that do not include an intermediate spool 34 would benefit from this disclosure. Although an example embodiment has been disclosed, a worker of ordinary skill in this art would recognize that certain modifications would come within the scope of this disclosure. For that reason, the following claims should be studied to determine the scope and content of this invention.

What is claimed is:

1. A geared turbofan gas turbine engine assembly comprising:
   a core section including a compressor section, a combustor section and a turbine section;
   a fan section including a gearbox and a fan;
   a low pressure spool supporting a low pressure turbine within the turbine section and driving the fan through the gearbox; and
   a high pressure spool supporting a high pressure compressor within the compressor section and a high pressure turbine within the turbine section, wherein the low pressure spool is supported for rotation about the axis at a forward position by a forward roller bearing and at an aft position by a thrust bearing, wherein the forward position of the forward roller bearing is aft of the gearbox and forward of the high pressure compressor.

2. The gas turbine engine assembly as recited in claim 1, wherein the high pressure spool is supported for rotation by a thrust bearing at a forward position and a roller bearing at an aft position.

3. The gas turbine engine assembly as recited in claim 2, wherein the roller bearing supporting rotation of the low pressure spool is forward of the thrust bearing supporting rotation of the high spool.

4. The gas turbine engine assembly as recited in claim 3, wherein the aft thrust bearing supporting rotation of the low pressure spool is aft of the roller bearing supporting rotation of the high pressure spool.

5. The gas turbine engine assembly as recited in claim 1, wherein the aft thrust bearing supporting rotation of the low pressure spool is supported by a turbine exhaust case.

6. The gas turbine engine assembly as recited in claim 1, including an intermediate pressure spool supported between the low pressure spool and the high pressure spool, the intermediate pressure spool supporting an intermediate pressure compressor within the compressor section and an intermediate pressure turbine in the turbine section.

7. The gas turbine engine assembly as recited in claim 6, wherein the intermediate pressure spool includes a forward thrust bearing and an aft roller bearing, wherein the forward thrust bearing is aft of the roller bearing supporting rotation of the low pressure spool.

8. The gas turbine engine assembly as recited in claim 1, wherein the gearbox is driven by the low pressure spool.

9. The gas turbine engine assembly as recited in claim 8, wherein the fan is supported by first and second roller bearings.

10. A geared turbofan gas turbine engine assembly comprising:
    a core section including a compressor section, a combustor section and a turbine section;
    a turbofan section including a gearbox and a fan;
    a low pressure spool supporting a low pressure turbine within the turbine section and driving the fan through the gearbox;
    an intermediate pressure spool supporting an intermediate pressure compressor within the compressor section and an intermediate pressure turbine within the turbine section; and
    a high pressure spool supporting a high pressure compressor within the compressor section and a high pressure turbine within the turbine section, wherein the low pressure spool is supported for rotation about the axis at a forward position by a forward roller bearing and at an aft position by a thrust bearing, wherein the forward position of the forward roller bearing is aft of the gearbox.

11. The geared turbofan gas turbine engine assembly as recited in claim 10, wherein the thrust bearing supporting the low pressure spool is supported by a turbine exhaust case.

12. The geared turbofan gas turbine engine assembly as recited in claim 10, wherein the high pressure spool is supported by a roller bearing disposed axially within the combustor section.

13. The gas turbine engine assembly as recited in claim 12, wherein the high pressure spool is supported for rotation by a thrust bearing at a forward position and the roller bearing disposed axially within the combustor section.

14. The gas turbine engine assembly as recited in claim 12, wherein the roller bearing supporting rotation of the low pressure spool is forward of the thrust bearing supporting rotation of the high pressure spool.

15. The gas turbine engine assembly as recited in claim 10, wherein the aft thrust bearing supporting rotation of the low pressure spool is aft of a roller bearing supporting rotation of the intermediate pressure spool.

* * * * *